US011716928B2

(12) United States Patent
Zhang et al.

(10) Patent No.: US 11,716,928 B2
(45) Date of Patent: Aug. 8, 2023

(54) LAWN MOWER

(71) Applicant: Globe (Jiangsu) Co., Ltd, Jiangsu (CN)

(72) Inventors: Wei Zhang, Jiangsu (CN); Xiaodong Guan, Jiangsu (CN)

(73) Assignee: Globe (Jiangsu) Co., Ltd, Changzhou (CN)

(*) Notice: Subject to any disclaimer, the term of this patent is extended or adjusted under 35 U.S.C. 154(b) by 424 days.

(21) Appl. No.: 17/106,126

(22) Filed: Nov. 29, 2020

(65) Prior Publication Data

US 2021/0168998 A1 Jun. 10, 2021

(30) Foreign Application Priority Data

Dec. 4, 2019 (CN) .......................... 201911224475.8

(51) Int. Cl.
*A01D 34/73* (2006.01)
*A01D 34/76* (2006.01)
*A01D 34/82* (2006.01)
*A01D 101/00* (2006.01)

(52) U.S. Cl.
CPC ............. *A01D 34/73* (2013.01); *A01D 34/76* (2013.01); *A01D 34/828* (2013.01); *A01D 2101/00* (2013.01)

(58) Field of Classification Search
CPC ....... A01D 34/73; A01D 34/76; A01D 34/828
See application file for complete search history.

(56) References Cited

U.S. PATENT DOCUMENTS

| 10,231,378 B2 | 3/2019 | Ikeno et al. | |
| 2012/0186930 A1* | 7/2012 | Salvia | A01D 34/664 |
| | | | 192/66.31 |
| 2012/0198706 A1* | 8/2012 | Yang | A01D 34/828 |
| | | | 30/286 |

(Continued)

FOREIGN PATENT DOCUMENTS

| BE | 558616 A | 7/1957 | |
| CN | 110720300 A * | 1/2020 | ........... A01D 34/008 |

(Continued)

OTHER PUBLICATIONS

The extended European Search Report of counterpart European Patent Application No. 20211657.0 dated Apr. 20, 2021.

*Primary Examiner* — Abigail A Risic

(57) ABSTRACT

A lawn mower comprises a driving assembly, an impact protection assembly, a transmission assembly and a cutting assembly. The impact protection assembly comprises a first bearing seat and a second bearing seat which are mated with each other, and an elastic member and a ball which are positioned between the first bearing seat and the second bearing seat. The first bearing seat is provided with a protrusion. When the driving assembly performs driving, the ball is pushed by the elastic member to be in contact with the protrusion of the first bearing seat, so that the transmission assembly and the cutting assembly are driven to rotate synchronously. When the resistance received by the cutting assembly is greater than a preset value, the elastic member is continuously compressed and the ball passes over the protrusion, and a relative rotation between the transmission assembly and the driving assembly occurs.

10 Claims, 7 Drawing Sheets

(56) References Cited

U.S. PATENT DOCUMENTS

2022/0039321 A1\* 2/2022 Zenkus ................ A01D 34/733

FOREIGN PATENT DOCUMENTS

| CN | 210226224 U | \* | 4/2020 | ............. A01D 34/73 |
| --- | --- | --- | --- | --- |
| EP | 2485575 A1 | | 8/2012 | |
| EP | 3583834 A1 | | 12/2019 | |
| FR | 2411503 A1 | | 7/1979 | |
| WO | 2019171589 A1 | | 9/2019 | |

\* cited by examiner

LAWN MOWER

CROSS-REFERENCE TO RELATED INVENTIONS

This application is based upon and claims the benefit of priority from the prior Chinese Patent Application No. 201911224475.8, filed on Dec. 4, 2019, the entire contents of which are incorporated herein by reference.

TECHNICAL FIELD

The invention relates to a lawn mower, and in particular to the technical field of garden tools.

BACKGROUND ART

In order to increase cutting width, the blade of the lawn mower is also changed from a single blade to dual blades, which greatly increases the cutting width of the lawn mower and meets the higher requirements of consumers.

During the mowing process, obstacles such as stones often appear on the lawn. When the blade rotates at high speed and hits the obstacle, the counterforce of the obstacle will cause the blade to stop and the counterforce will pass through the blade connecting shaft to the plastic gear. At this time, the motor is still running, and the momentary torque is very large, which will cause the gears to collide with each other, causing the gears to damage and the lawn mower can't work normally.

In view of the foregoing problems, it is an object of the present invention to provide an improved lawn mower which can prevent an impact load from transmitting to the output shaft.

SUMMARY OF INVENTION

The object of the present invention is to provide a lawn mower, which has an impact protection function.

In order to achieve the above object, the present invention provides a lawn mower, which comprises a driving assembly, an impact protection assembly, a transmission assembly, and a cutting assembly. The impact protection assembly comprises a first bearing seat, a second bearing seat that is mated with the first bearing seat, and an elastic member and a ball that are disposed between the first bearing seat and the second bearing seat. The first bearing seat is provided with a protrusion. When the driving assembly is driven, the ball is pushed by the elastic member to contact with the protrusion of the first bearing seat to drive the transmission assembly and the cutting assembly to rotate synchronously. When the resistance received by the cutting assembly is greater than a preset value, the elastic member is continuously compressed and the ball passes over the protrusion, and a relative rotation between the transmission assembly and the driving assembly occurs.

As a further improvement of the present invention, the first bearing seat is further provided with a sliding groove for receiving the ball, and the sliding groove is annularly arranged and passes over the protrusion.

As a further improvement of the present invention, the driving assembly comprises a motor and a motor shaft, one end of the motor shaft is inserted into the first bearing seat, and a flat key is received in the first bearing seat so the motor shaft transmits the torque to the first bearing seat through the flat key.

As a further improvement of the present invention, the second bearing seat comprises a boss, and the elastic member and the ball are received in the boss, and when the second bearing seat is sleeved on the first bearing seat, the ball is in contact with the first bearing seat, and the elastic member is disposed between the boss and the ball.

As a further improvement of the present invention, the impact protection assembly further comprises a driving shaft connecting the transmission assembly and the cutting assembly, and a unilateral bearing sleeved on the driving shaft, when the driving assembly being driving, the transmission assembly driving the driving shaft, the unilateral bearing and the cutting assembly to rotate synchronously, when the resistance received by the cutting assembly being greater than a preset value, the unilateral bearing locking the driving shaft.

As a further improvement of the present invention, the transmission assembly comprises a first gear connected to the second bearing seat and a second gear meshed with the first gear, and the cutting assembly comprises a first blade assembly connected to the second gear, and the driving shaft and the unilateral bearing are connected between the second gear and the first blade assembly.

As a further improvement of the present invention, the transmission assembly further comprises a third gear and a fourth gear, the third gear meshes with the first gear and the fourth gear, respectively, and the cutting assembly further comprises a second blade assembly connected to the fourth gear, and the driving shaft and the unilateral bearing are also connected between the fourth gear and the second blade assembly.

As a further improvement of the present invention, the centers of the first gear, the second gear, the third gear, and the fourth gear are located on the same line, and the first blade assembly and the second blade assembly are perpendicular to each other and rotate in opposite directions in the same plane.

As a further improvement of the present invention, the transmission assembly further comprises a gear box formed with an accommodating space and a cover plate for covering the accommodating space, the gear box comprising a bottom wall, an annular side wall protruding upward from the bottom wall, and two protruding portions protruding downward from opposite ends of the bottom wall, the accommodating space being formed between the bottom wall and the annular side wall, the driving assembly being fixed on the cover plate, the two driving shafts respectively protruding downward beyond the corresponding protruding portion.

As a further improvement of the present invention, the first gear, the second gear, the third gear, and the fourth gear are received in the accommodating space, and the second gear and the third gear are disposed on opposite sides of the first gear, and the fourth gear is disposed away from the first gear.

The beneficial effect of the present invention is that the lawn mower of the present invention is provided with an elastic member and a ball between the first bearing seat and the second bearing seat, and at the same time, a protrusion is provided on the first bearing seat, so that when the driving assembly drives, the ball is pushed by the elastic member to contact with the protrusion of the first bearing seat, and the transmission assembly and the cutting assembly can be driven to rotate synchronously. When the resistance received by the cutting assembly is greater than a preset value, the elastic member is continuously compressed and the ball passes over the protrusion, and a relative rotation between the transmission assembly and the driving assembly occurs. And then the purpose of protecting the transmission assembly can be achieved.

DESCRIPTION OF EMBODIMENT

In order to make the objectives, technical solutions, and advantages of the present invention clearer, the following describes the present invention in detail with reference to the accompanying drawings and specific embodiment.

The invention discloses a lawn mower (not shown), which includes a main body, a push rod extending backward from the main body, and a walking wheel provided at the bottom of the main body. The walking wheel includes two front traveling wheels arranged on both sides of the front end of the main body and two rear traveling wheels arranged on both sides of the rear end of the main body. Because the push rod and the walking wheel can be designed according to the existing scheme, the structure of the push rod and the walking wheel will not be described.

Figure 1:
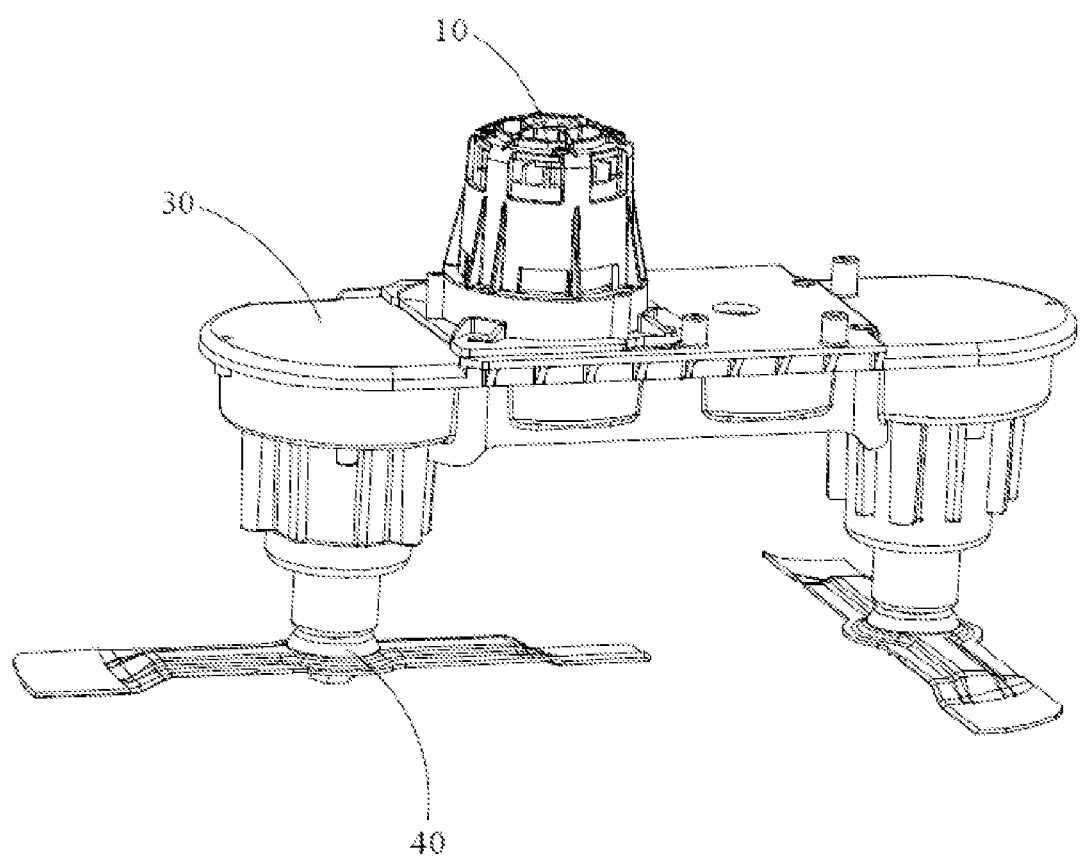
FIG. 1 is a partial perspective view of the lawn mower according to the present invention.
Figure 2:
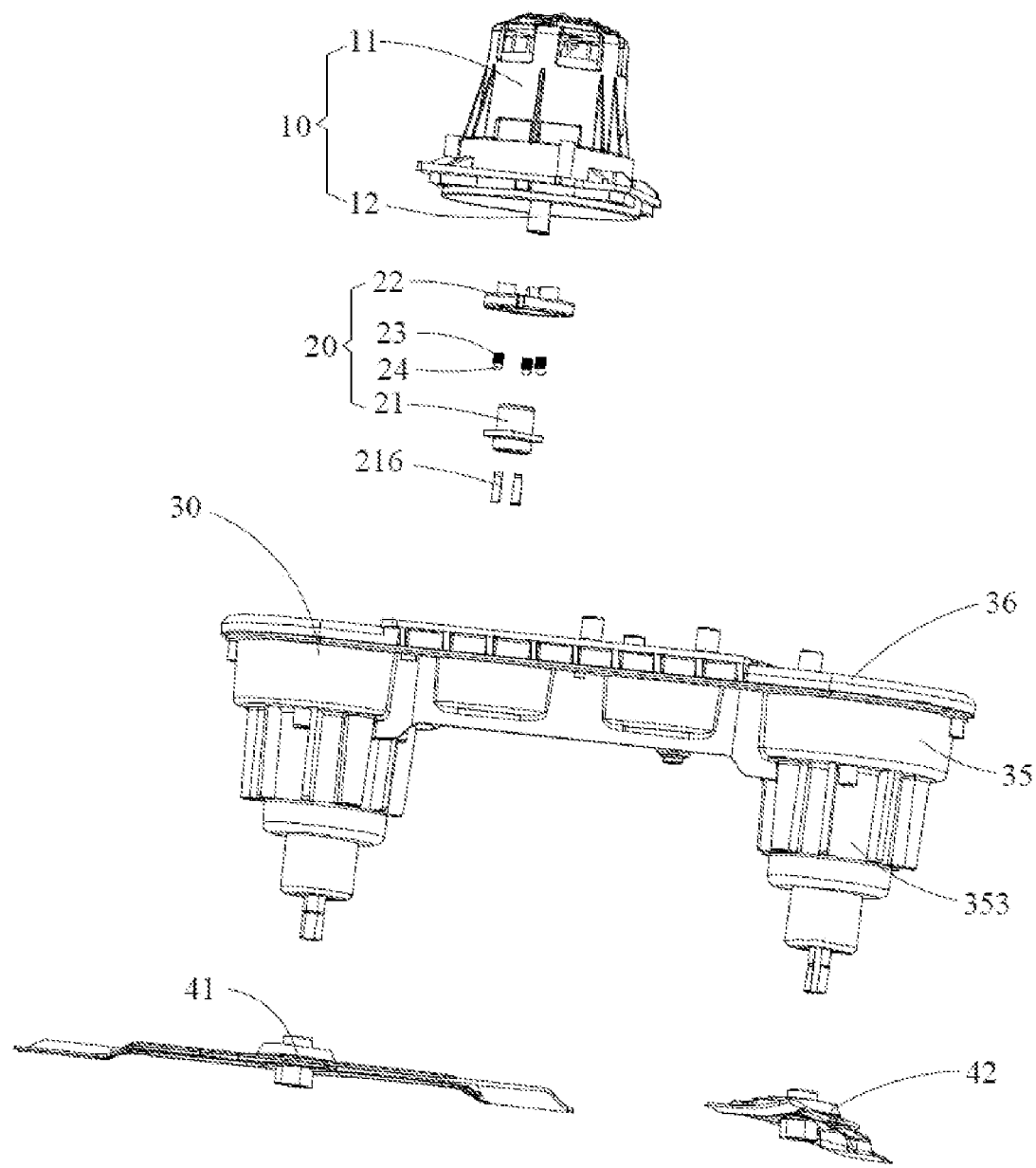
FIG. 2 is a partially exploded view of FIG. 1.

As shown in FIG. 1 and FIG. 2, a driving assembly 10, an impact protection assembly 20, a transmission assembly 30, and a cutting assembly 40 are installed on the main body. The driving assembly 10 is used to drive the transmission assembly 30 to rotate, and the transmission assembly 30 and the cutting assembly 40 are connected, so that when the transmission assembly 30 rotates, the cutting assembly 40 can be driven to rotate.

The driving assembly 10 includes a motor 11 and a motor shaft 12. The motor shaft 12 protrudes beyond the bottom of the motor 11, and one end of the motor shaft 12 extends into the transmission assembly 30. When the motor 11 is turned on, the motor shaft 12 rotates and drives the transmission assembly 30 to rotate.

Figure 4:
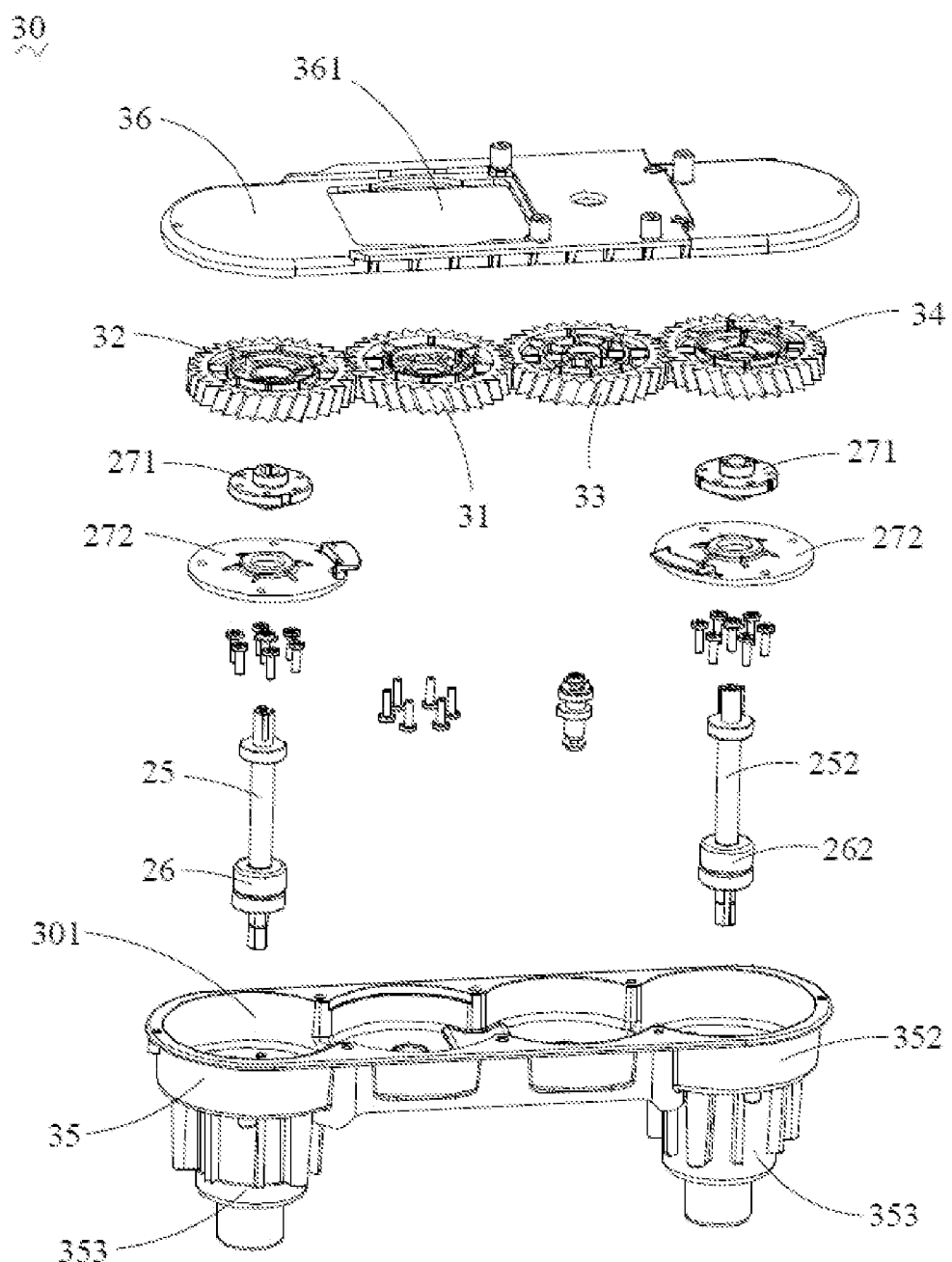
FIG. 4 is an exploded view of the transmission assembly in FIG. 2.
Figure 5:
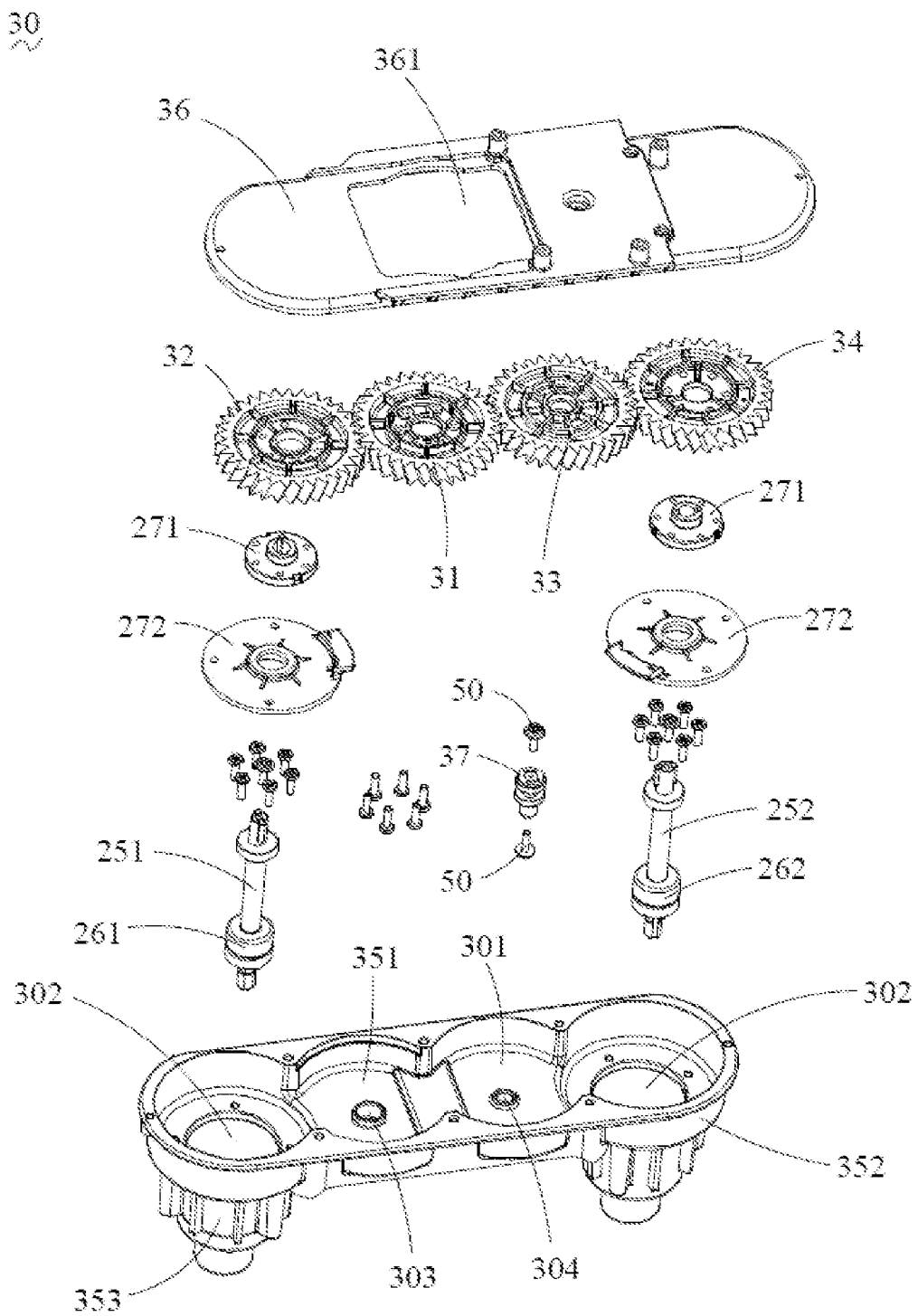
FIG. 5 is another perspective view of FIG. 4.
Figure 6:
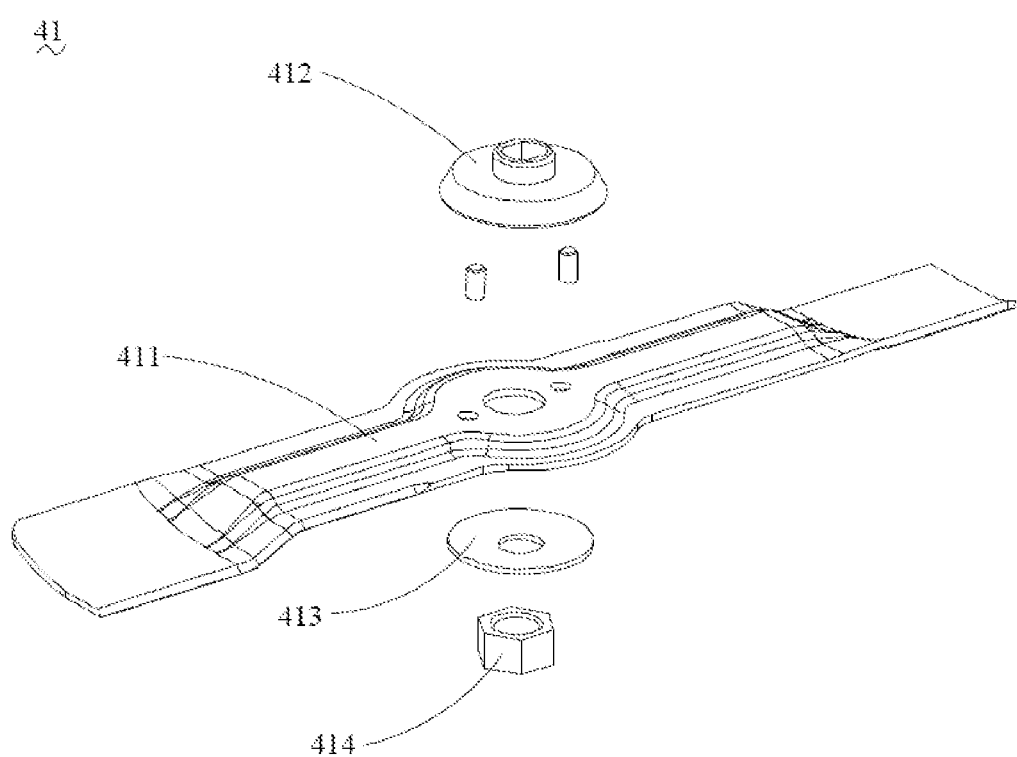
FIG. 6 is an exploded view of the first blade in FIG. 2.
Figure 7:
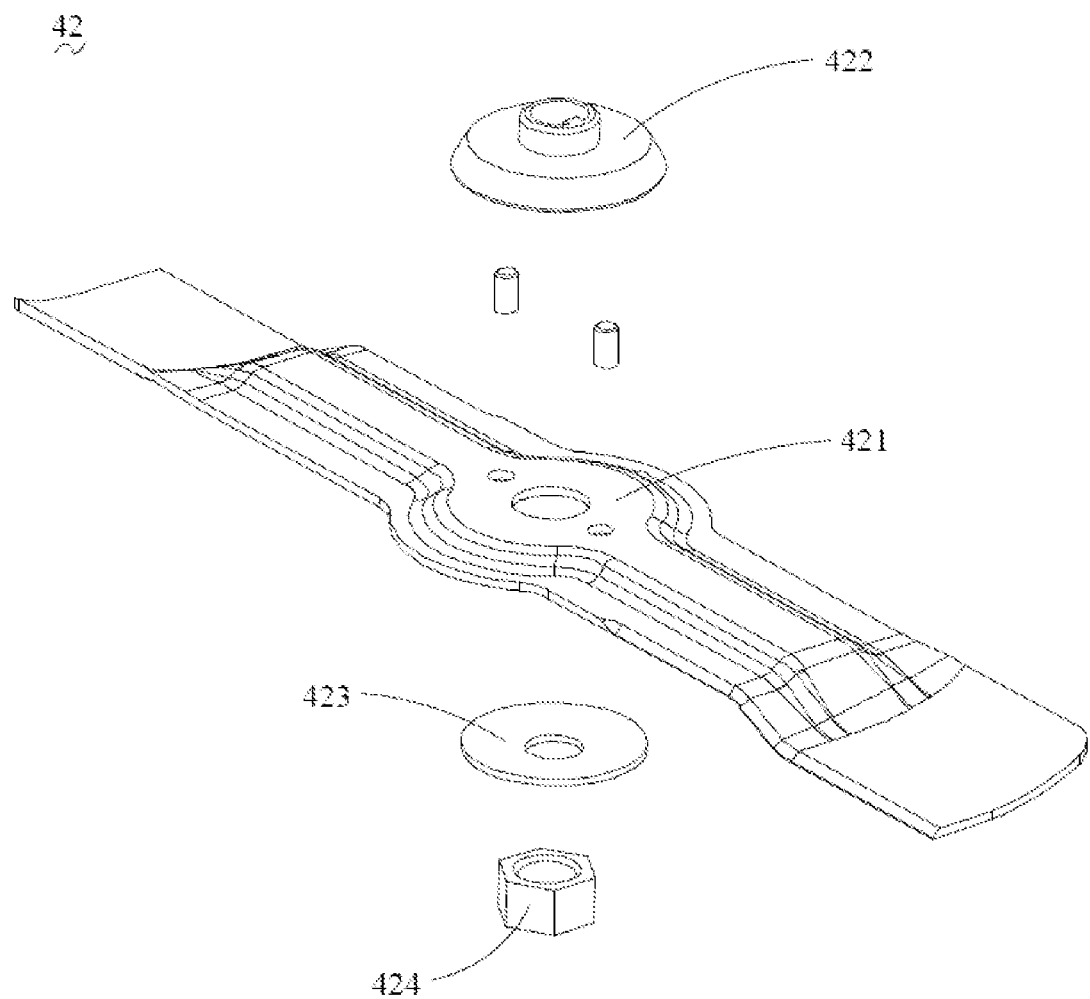
FIG. 7 is an exploded view of the second blade in FIG. 2.

As shown in FIG. 4 and FIG. 5, the transmission assembly 30 includes a first gear 31, a second gear 32, a third gear 33, and a fourth gear 34 which are horizontally arranged. The center of the first gear 31, the second gear 32, the third gear 33 and the fourth gear 34 are located on the same straight line. The first gear 31 is connected to the motor shaft 12 so as to rotate synchronously with the motor shaft 12 driven by the motor shaft 12.

The second gear 32 meshes with the first gear 31, and the third gear 33 meshes with the first gear 31 and the fourth gear 34, respectively. In other words, the second gear 32 and the third gear 33 are disposed on opposite sides of the first gear 31, and the fourth gear 34 meshes with the third gear 33. When the first gear 31 is rotated by the motor shaft 12, the second gear 32 and the third gear 33 can be synchronously rotated, and the fourth gear 34 is also rotated synchronously by the third gear 33. The second gear 32 and the fourth gear 34 rotates in the opposite direction, that is, when the first gear 31 rotates clockwise, the second gear 32 rotates counterclockwise, and the fourth gear 34 rotates clockwise.

The transmission assembly 30 further includes a gear box 35 formed with an accommodating space 301 and a cover plate 36 for covering the accommodating space 301. The first gear 31, the second gear 32, the third gear 33, and the fourth gear 34 are all accommodated in the accommodating space 301. The gear box 35 includes a bottom wall 351, an annular side wall 352 protruding upward from the bottom wall 351, and two protruding portions 353 protruding downward from opposite ends of the bottom wall 351. The accommodating space 301 is formed by the bottom wall 351 and the annular side wall 352. Two receiving spaces 302 communicating with the accommodating space 301 are respectively provided in the two protruding portions 353, and the receiving space 302 penetrates the corresponding protruding portion 353 downward.

The bottom wall 351 of the gear box 35 is further provided with a convex post 303 and a through hole 304. The convex post 303 is provided in a blind hole shape and is used to cooperate with the impact protection assembly 20 so as to limit the gear 31 in the up and down direction. The through hole 304 is correspondingly provided at the bottom of the third gear 33. The fixed shaft 37 is received in the through hole 304 and fixed to the bottom wall 351 of the gear box 35 by the screw 50. The third gear 33 is rotatably fixed at the fixed shaft 37, in this way, it is ensured that the third gear 33 will not move arbitrarily in the gear box 35 and will not leave the gear box 35.

The periphery of the cover plate 36 and the annular side wall 352 of the gear box 35 are fixed by screws to seal the accommodating space 301 and ensure that the first gear 31, the second gear 32, the third gear 33, and the fourth gear 34 can be fixed at a space to rotate. The cover plate 36 is provided in a horizontal plate structure and is provided with mounting holes 361 penetrating up and down. The driving assembly 10 is fixed on the cover plate 36 and is fixedly connected to the cover plate 36 through the mounting hole 361. The motor shaft 12 passes downward through the mounting hole 361 and enters the inside of the accommodating space 301 and is connected to the first gear 31 and then drives the first gear 31 to rotate.

Figure 3:
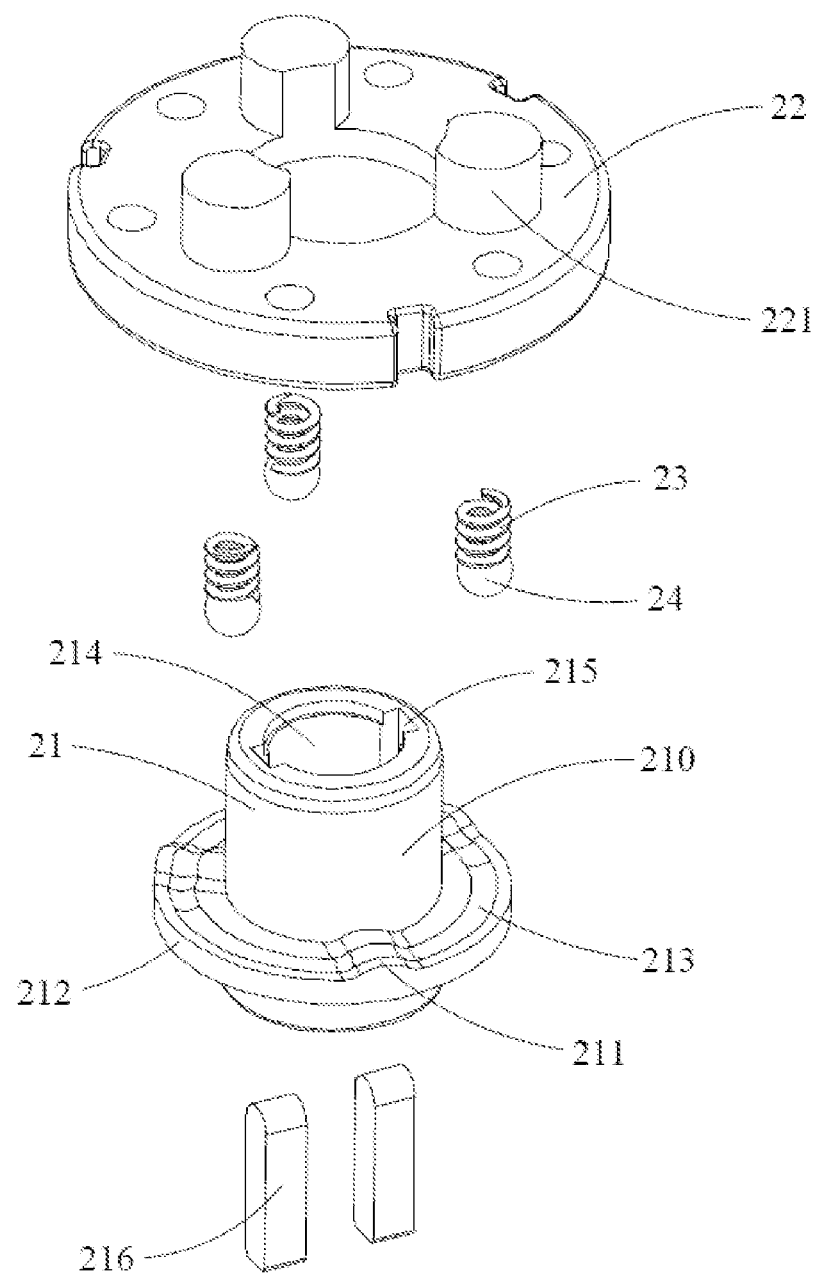
FIG. 3 is an exploded view of the impact protection assembly in FIG. 2.

As shown in FIG. 3 and in combination with FIG. 2, the impact protection assembly 20 includes a first bearing seat 21 and a second bearing seat 22 which are transitionally fitted, and an elastic member 23 and a ball 24 located between the first bearing seat 21 and the second bearing seat 22. The first bearing seat 21 is provided with at least one protrusion 211. When the driving assembly 10 is normally driven, the ball 24 is pushed to by the elastic member 23 to contact the protrusion 211 of the first bearing seat 21, in order to drive the transmission assembly 30 and the cutting assembly 40 to rotate synchronously. When the resistance received by the cutting assembly 40 is greater than a preset value, the elastic member 23 is continuously compressed and the ball 24 passes over the protrusion 211, and a relative rotation is generated between the transmission assembly 30 and the driving assembly 10.

Specifically, the first bearing seat 21 includes a cylindrical body portion 210 and an extending portion 212 extending outwardly from an outer side wall of the body portion 210. The extending portion 212 is provided in a ring shape and has a larger diameter than the diameter of the body portion 210. Three protrusions 211 are provided on the upper surface of the extending portion 212 and are evenly distributed. The extending portion 212 is also provided with a sliding groove 213 for the ball 24 to slide. The sliding groove 213 is annularly arranged and passes over the protrusion 211. That is, the protrusion 211 is also provided with a sliding groove 213, so that the ball 24 can slide between the two adjacent protrusions 211 along the sliding groove 213, or can directly pass over the protrusion 211 along the sliding groove 213.

The body portion 210 is provided with an inner cavity 214 and two grooves 215 formed by being recessed outward from the inner side wall of the body portion 210. Each groove 215 contains a flat key 216, and one end of the motor shaft 12 is inserted into the inner cavity 214 and cooperates with the two flat keys 216. In this way, torque can be transmitted between the motor shaft 12 and the first bearing seat 21 through the flat keys 216.

The second bearing seat 22 is sleeved outside the body portion 210 of the first bearing seat 21 and cooperates with the extending portion 212. The second bearing seat 22 is provided with a boss 221, and the elastic member 23 and the ball 24 are received in the boss 221. That is, when the second bearing seat 22 is sleeved on the first bearing seat 21, the ball 24 is in contact with the sliding groove 213 on the first bearing seat 21 and the ball 24 is at least partially received in the boss 221. The elastic member 23 is compressed and accommodated between the boss 221 and the ball 24 in a limited position. In this embodiment, three bosses 221, three elastic members 23, and three balls 24 are also provided respectively to correspond to the three protrusions 211, but it should not be limited to this.

The second bearing seat 22 and the first gear 31 are fixed together by screws, and the first bearing seat 21 and the motor shaft 12 are fixed by two flat keys 216, so that the entire impact protection assembly 20 does not fall down, and the stability is better.

As shown in FIGS. 2 and 4, in order to further protect the transmission assembly 30, the present application further adds a locking structure (as part of the impact protection assembly 20) between the transmission assembly 30 and the cutting assembly 40. And the rotation direction of the locking structure is opposite to the rotation direction of the cutting assembly 40, so that when the cutting assembly 40 hits a hard object, the locking structure is directly locked, and a part of the momentary impact force is transferred to the gear box 35 to reduce the impact on the transmission assembly 30.

Specifically, the impact protection assembly 20 further includes a driving shaft 25 connecting the transmission assembly 30 and the cutting assembly 40 and a unilateral bearing 26 sleeved on the driving shaft 25. When the driving assembly 10 is normally driven, the transmission assembly 30 drives the driving shaft 25, the unilateral bearing 26 and the cutting assembly 40 to rotate synchronously. When the resistance received by the cutting assembly 40 is greater than a preset value, the unilateral bearing 26 locks the driving shaft 25 to avoid the transmission assembly 30 from being affected by the momentary impact force.

As shown in FIGS. 4 to 7 in combination with FIG. 2, the cutting assembly 40 includes a first blade assembly 41 connected to the second gear 32 and a second blade assembly 42 connected to the fourth gear 34. Since the rotation directions of the second gear 32 and the fourth gear 34 are opposite, the first blade assembly 41 and the second blade assembly 42 are perpendicular to each other and rotate in opposite directions in the same plane.

The first blade assembly 41 includes a first blade 411, a first fixing seat 412 positioned above the first blade 411 to limit the first blade 411, a first shim 413 positioned below the first blade 411, and a first nut 414 for fixing the first shim 413, the first blade 411, and the first fixing seat 412 together. The second blade assembly 42 includes a second blade 421, a second fixing seat 422 positioned above the second blade 421 to limit the second blade 421, a second shim 423 positioned below the second blade 421, and second nut 424 for fixing the second shim 423, the second blade 421, and the second fixing seat 422 together. Both the first blade 411 and the second blade 421 are used to mower grass, and they have the same rotation speed and opposite rotation directions.

Since the cutting assembly 40 includes a first blade assembly 41 and a second blade assembly 42, two driving shafts 25 are correspondingly provided, which include a first driving shaft 251 connected between the second gear 32 and the first blade 411, and a second driving shaft 252 connected between the fourth gear 34 and the second blade 421. The unilateral bearings 26 are also provided with two, which include respectively the first unilateral bearing 261 sleeved on the first driving shaft 251 and a second unilateral bearing 262 sleeved on the second driving shaft 252.

The first driving shaft 251 is accommodated in the receiving space 302 of one of the protruding portions 353 of the gear box 35, and the top end is fixedly connected to the second gear 32 through the bearing seat 271 and the end cover 272, and the bottom end protrudes downward beyond the protruding portion 353. The protruding portion 353 is connected to the first blade 411 through the first fixing seat 412. And the bottom end goes through the first shim 413 and is fixed to the first nut 414, so the first blade 411 is fixed to the first driving shaft 251. The first unilateral bearing 261 is located at the lower end of the first driving shaft 251 and is disposed near the first fixing seat 412. When the first driving shaft 251 is rotated by the second gear 32, it can drive the first blade assembly 41 to rotate as a whole, and the first blade 411 performs a cutting operation.

The second driving shaft 252 is received in the receiving space 302 of the other protruding portion 353 of the gear box 35, and the top end is also fixedly connected to the fourth gear 34 through the bearing seat 271 and the end cover 272, and the bottom end protrudes downward beyond the protruding portion 353 and is connected to the second blade 421 through the second fixing seat 422. And the bottom end goes through the second shim 423 and is fixed to the second nut 424, so the second blade 421 is fixed to the second driving shaft 251. The second unilateral bearing 262 is located at the lower end of the second driving shaft 252 and is disposed close to the second fixing seat 422. When the second driving shaft 252 is rotated by the fourth gear 34, the second blade 42 can be rotated as a whole, and the second blade 421 performs a cutting operation.

When the driving assembly 10 is normally driven, firstly the motor shaft 12 drives the first bearing seat 21 to rotate. When the first bearing seat 21 rotates until the ball 24 contacts the protrusion 211, the elastic member 23 is compressed. The axial force received by the first gear 31 cannot continue to compress the elastic member 23, so that the ball 24 cannot pass over the protrusion 211 on the first bearing seat 21, and the second bearing seat 22 and the first gear 31 rotate with the first bearing seat 21. Then, with the drive of the first gear 31, the second gear 32, the third gear 33 and the fourth gear 34 rotate synchronously Finally, the second gear 32 drives the first driving shaft 251 and the first unilateral bearing 261 to rotate, and the first blade 411 rotates smoothly. The fourth gear 34 drives the second driving shaft 252 and the second unilateral bearing 262 to rotate, and the second blade 421 rotates smoothly. At this time, the first blade 411 and the second blade 421 can perform mowing at the same time.

When the first blade 411 rotates at a high speed, if it hits a hard object in an instant, the first blade 411 will quickly transmit the reverse axial force it receives to the second gear 32, and the first gear 31 receives a big axial force at the same time. The axial force will continue to compress the elastic member 23 in an instant, and the ball 24 passes over the protrusion 211 on the first bearing seat 21, so that no torque can be transmitted between the first bearing seat 21 and the second bearing seat 22, and the first gear 31 is slipping. That is, the first bearing seat 21 and the second bearing seat 22 are unloaded, and the first gear 31, the second gear 32, the third gear 33, and the fourth gear 34 are protected. In addition, the first blade 411 also transmits the received reverse axial force to the first driving shaft 251 and the first unilateral bearing 261. Since the first unilateral bearing 261 can only rotate in one direction, the first unilateral bearing 261 locks the first driving shaft 251 under the action of a large axial force. At this time, part of the axial force is distributed to the gear box 35, so that the instantaneous impact force received by the first gear 31, the second gear 32, the third gear 33, and the fourth gear 34 is small, thereby protecting the first gear 31, the second gear 32, the third gear 33, and the fourth gear 34.

Similarly, when the second blade 421 rotates at a high speed, if it hits a hard object instantly, the elastic member 23 and the ball 24 can also be used to unload the first bearing seat 21 and the second bearing seat 22. At the same time, the second unilateral bearing 262 can also be used to lock the second driving shaft 252, so that part of the instant impact force is distributed to the gear box 35, so that the instantaneous impact force received by the first gear 31, the second gear 32, the third gear 33, and the fourth gear 34 is small.

In summary, on the one hand, the lawn mower of the present invention is provided with an elastic member 23 and a ball 24 between the first bearing seat 21 and the second bearing seat 22, and a protrusion 211 is provided on the first bearing seat 21. Therefore, when the driving assembly 10 is normally driven, the ball 24 is pushed by the elastic member 23 into contact with the protrusion 211 of the first bearing seat 21. And then the transmission assembly 30 and the cutting assembly 40 are driven to rotate synchronously. When the cutting assembly 40 receives an external obstacle's reaction force greater than a preset value, the elastic member 23 is continuously compressed and the ball 24 passes over the protrusion 211, causing relative rotation between the transmission assembly 30 and the driving assembly 10 to achieve unloading. The purpose of protecting the transmission assembly 30 is achieved.

On the other hand, the driving shaft 25 and the unilateral bearing 26 sleeved on the driving shaft 25 are disposed between the transmission assembly 30 and the cutting assembly 40. When the driving assembly 10 is normally driven, the transmission assembly 30 drives the driving shaft 25. The unilateral bearing 26 and the cutting assembly 40 rotate synchronously. When the reaction force of the cutting assembly 40 by an external obstacle is greater than a preset value, the unilateral bearing 26 locks the driving shaft 25 to prevent the transmission assembly 30 from receiving the instant impact force. The purpose of protecting the transmission assembly 30 is achieved.

The above embodiment is only used to illustrate the technical solution of the present invention. Although the present invention has been described in detail with reference to the preferred embodiment, those skilled in the art should understand that the technical solution of the present invention may be modified or equivalently replaced without departing from the spirit and scope of the technical solution of the present invention.

What is claimed is:

1. A lawn mower, which comprises:
   a driving assembly;
   an impact protection assembly, the impact protection assembly comprising a first bearing seat, a second bearing seat that is mated with the first bearing seat, and an elastic member and a ball that are disposed between the first bearing seat and the second bearing seat, the first bearing seat being provided with a protrusion;
   a transmission assembly; and
   a cutting assembly, when the driving assembly is driven, the ball is pushed by the elastic member to contact with the protrusion of the first bearing seat to drive the transmission assembly and the cutting assembly to rotate synchronously, when the resistance received by the cutting assembly is greater than a preset value, the elastic member is continuously compressed and the ball passes over the protrusion, and a relative rotation between the transmission assembly and the driving assembly occurs.

2. The lawn mower according to claim 1, wherein the first bearing seat is further provided with a sliding groove for receiving the ball, and the sliding groove is annularly arranged and passes over the protrusion.

3. The lawn mower according to claim 1, wherein the driving assembly comprises a motor and a motor shaft, one end of the motor shaft is inserted into the first bearing seat, and a flat key is received in the first bearing seat so the motor shaft transmits the torque to the first bearing seat through the flat key.

4. The lawn mower according to claim 1, wherein the second bearing seat comprises a boss, and the elastic member and the ball are received in the boss, and when the second bearing seat is sleeved on the first bearing seat, the ball is in contact with the first bearing seat, and the elastic member is disposed between the boss and the ball.

5. The lawn mower according to claim 1, wherein the impact protection assembly further comprises a driving shaft connecting the transmission assembly and the cutting assembly, and a unilateral bearing sleeved on the driving shaft, when the driving assembly being driving, the transmission assembly driving the driving shaft, the unilateral bearing and the cutting assembly to rotate synchronously, when the resistance received by the cutting assembly being greater than a preset value, the unilateral bearing locking the driving shaft.

6. The lawn mower according to claim 5, wherein the transmission assembly comprises a first gear connected to the second bearing seat and a second gear meshed with the first gear, and the cutting assembly comprises a first blade assembly connected to the second gear, and the driving shaft and the unilateral bearing are connected between the second gear and the first blade assembly.

7. The lawn mower according to claim 6, wherein the transmission assembly further comprises a third gear and a fourth gear, the third gear meshes with the first gear and the fourth gear, respectively, and the cutting assembly further comprises a second blade assembly connected to the fourth gear, and the driving shaft and the unilateral bearing are also connected between the fourth gear and the second blade assembly.

8. The lawn mower according to claim 7, wherein the centers of the first gear, the second gear, the third gear, and the fourth gear are located on the same line, and the first blade assembly and the second blade assembly are perpendicular to each other and rotate in opposite directions in the same plane.

9. The lawn mower according to claim 7, wherein the transmission assembly further comprises a gear box formed with an accommodating space and a cover plate for covering the accommodating space, the gear box comprising a bottom wall, an annular side wall protruding upward from the bottom wall, and two protruding portions protruding downward from opposite ends of the bottom wall, the accommodating space being formed between the bottom wall and the annular side wall, the driving assembly being fixed on the cover plate, the two driving shafts respectively protruding downward beyond the corresponding protruding portion.

10. The lawn mower according to claim 9, wherein the first gear, the second gear, the third gear, and the fourth gear are received in the accommodating space, and the second gear and the third gear are disposed on opposite sides of the first gear, and the fourth gear is disposed away from the first gear.

\* \* \* \* \*